(12) United States Patent
Loeffelmann et al.

(10) Patent No.: US 11,965,595 B2
(45) Date of Patent: Apr. 23, 2024

(54) PARK LOCK GEAR ASSEMBLY FOR A TRANSMISSION UNIT OF A VEHICLE

(71) Applicant: Schaeffler Technologies AG & Co. KG, Herzogenaurach (DE)

(72) Inventors: Jochen Loeffelmann, Eggolsheim (DE); Peter Welker, Herzogenaurach (DE)

(73) Assignee: Schaeffler Technologies AG &Co. KG, Herzogenaurach (DE)

( * ) Notice: Subject to any disclaimer, the term of this patent is extended or adjusted under 35 U.S.C. 154(b) by 0 days.

(21) Appl. No.: 17/919,767

(22) PCT Filed: Mar. 5, 2021

(86) PCT No.: PCT/DE2021/100225
§ 371 (c)(1),
(2) Date: Oct. 19, 2022

(87) PCT Pub. No.: WO2021/213568
PCT Pub. Date: Oct. 28, 2021

(65) Prior Publication Data
US 2023/0175584 A1    Jun. 8, 2023

(30) Foreign Application Priority Data
Apr. 20, 2020    (DE) .................. 10 2020 110 618

(51) Int. Cl.
*F16H 63/34*    (2006.01)
*F16H 57/021*    (2012.01)

(52) U.S. Cl.
CPC ....... *F16H 63/3425* (2013.01); *F16H 57/021* (2013.01)

(58) Field of Classification Search
CPC .................. F16H 63/3425; F16H 57/021
See application file for complete search history.

(56) References Cited

U.S. PATENT DOCUMENTS

2021/0332877 A1* 10/2021 Li .................. F16H 63/3466

FOREIGN PATENT DOCUMENTS

| CN | 104930186 A | 9/2015 |
| CN | 109073066 A | 12/2018 |
| DE | 102004059667 A1 | 7/2005 |

(Continued)

OTHER PUBLICATIONS

Machine translation of EP1288531A2, retrieved from www.espacenet.com (Year: 2023).*

(Continued)

*Primary Examiner* — Stacey A Fluhart

(57) ABSTRACT

A park lock gear assembly for a transmission unit of a vehicle includes a transmission shaft, a park lock gear arranged on the transmission shaft, a housing unit of a motor unit and a bearing assembly. The housing unit has a portion extending parallel to the transmission shaft and adjacent to the park lock gear, and the bearing assembly is disposed between the park lock gear and the portion of the housing unit. The bearing assembly may be arranged with a radial clearance between the park lock gear and the portion of the housing unit. The bearing assembly may be arranged on the portion of the housing unit with the radial clearance between the bearing assembly and the park lock gear.

17 Claims, 2 Drawing Sheets

(56) References Cited

FOREIGN PATENT DOCUMENTS

| DE | 102011006281 | A1 |   | 10/2012 |           |
|----|--------------|----|---|---------|-----------|
| DE | 102015214339 | A1 | * | 2/2017  |           |
| DE | 102018203453 | A1 | * | 9/2019  |           |
| DE | 102018203453 | A1 |   | 9/2019  |           |
| DE | 202020100331 | U1 |   | 2/2020  |           |
| DE | 102018123863 | A1 |   | 4/2020  |           |
| EP | 1288531      | A2 | * | 3/2003  | F16H 57/021 |
| WO | 2019206422   | A1 |   | 10/2019 |           |

OTHER PUBLICATIONS

Title: Handbook of Non-standard Mechanical Design, Publisher: Defense Industry Publishing House, Editor—Cen Junjian, Zhao Juchu Nan Wenhai, pp. 12-13.

* cited by examiner

PARK LOCK GEAR ASSEMBLY FOR A TRANSMISSION UNIT OF A VEHICLE

CROSS-REFERENCE TO RELATED APPLICATIONS

This application is the United States National Phase of PCT Appln. No. PCT/DE2021/100225 filed Mar. 5, 2021, which claims priority to German Application No. DE102020110618.1 filed Apr. 20, 2020, the entire disclosures of which are incorporated by reference herein.

TECHNICAL FIELD

The present disclosure relates to a park lock gear assembly for a transmission unit of a vehicle, a motor/transmission unit having such a park lock gear assembly, and the use of a bearing unit in such a park lock gear assembly.

BACKGROUND

Park lock gear assemblies for vehicle transmission units are known in the prior art. Such park lock gear assemblies for transmission units are used in particular in vehicles that are equipped with an automatic transmission or a fully or partially automated manual transmission. In the case of purely manual transmissions, no park lock gear assembly is usually provided. However, a park lock gear assembly can also be provided in a purely manual transmission. It is known to form a park lock gear assembly as a mechanical locking device for the transmission unit. Here, a locking pawl is usually provided, which can engage in a non-rotatable manner with a ratchet wheel connected to a transmission shaft of the transmission to form the park lock function.

SUMMARY

A park lock gear assembly for a transmission unit of a vehicle according to the disclosure includes: at least one park lock gear which is arranged on a transmission shaft of a transmission unit of a vehicle; at least one housing unit of a motor unit, the housing unit including at least a portion which is provided parallel to the transmission shaft and arranged to be adjacent to the park lock gear; and at least one bearing assembly arranged between the park lock gear and the at least one portion of the housing unit.

The present disclosure considers that, in known park lock gear assemblies, impact loads that might occur on the transmission unit and/or on the motor unit are only received by the motor bearing assembly or the rotor shaft bearing assembly, and this can lead to a high load on the rotor shaft bearing assembly. In the present case, it is now proposed to provide a further bearing assembly/bearing unit on or below the park lock gear so that any impact loads that might occur can be received by this bearing assembly or additionally received by this bearing assembly. As a result, the impact load that must be received by the rotor shaft bearing assembly can be reduced and the risk of damage to the rotor shaft bearing assembly can also be correspondingly reduced.

The portion of the housing unit that is arranged parallel to the transmission shaft or parallel to the rotor shaft provides such a contact surface for the bearing assembly that it can be arranged below the park lock gear. An adjacent assembly is to be understood broadly, namely such that the housing portion can provide a contact surface for the bearing assembly.

The bearing assembly may be arranged with a radial clearance between the park lock gear and the at least one portion of the housing unit. The bearing assembly may be arranged in a non-rotatable manner on at least one housing portion of the housing unit and a radial clearance with respect to the park lock gear may be provided. The bearing assembly may not be in engagement with the park lock gear during operation. Because a radial clearance is provided between the park lock gear and the bearing assembly, the losses can be reduced and the speed stability increased.

The park lock gear may be formed integrally with a pinion element of the transmission unit of the vehicle, and the transmission unit may be a coaxial transmission unit. The integral design of the park lock gear with at least one pinion element of the transmission unit can reduce the number of parts. In addition, corresponding pre-pieces can be provided, which can be put together to form various park lock gear assemblies, depending on the application.

The bearing assembly may be a rolling bearing unit, which may be pressed onto the at least one portion of the housing unit. The bearing assembly may be a radial bearing assembly. By pressing the bearing assembly onto the portion of the housing unit, the putting together of a park lock gear assembly can be further simplified since the bearing unit can be arranged on the portion of the housing unit before the motor unit and the transmission unit are connected.

Furthermore, the bearing assembly may be arranged to be axially adjacent to a rotor shaft bearing assembly of the rotor shaft. The bearing assembly may be provided on an outside of the housing unit, and the rotor shaft bearing assembly may be provided on an inside. In this context, however, an adjacent assembly does not mean an immediately adjacent assembly. Rather, the rotor shaft bearing assembly and the bearing assembly can also be arranged at a distance from one another.

The bearing assembly and the rotor shaft bearing assembly may be arranged at the same radial distance from the axis of rotation of the rotor shaft. As a result, corresponding impact loads can be introduced into both or into the bearing assembly.

Furthermore, the present disclosure relates to a motor/transmission unit, including at least one park lock gear assembly as described above.

The present disclosure further relates to the use of a bearing unit in a park lock gear assembly as described above.

BRIEF DESCRIPTION OF THE DRAWINGS

Further features, advantages and possible applications of the present disclosure result from the following description, the exemplary embodiment and the figures. In the figures.

DETAILED DESCRIPTION

Figure 1:
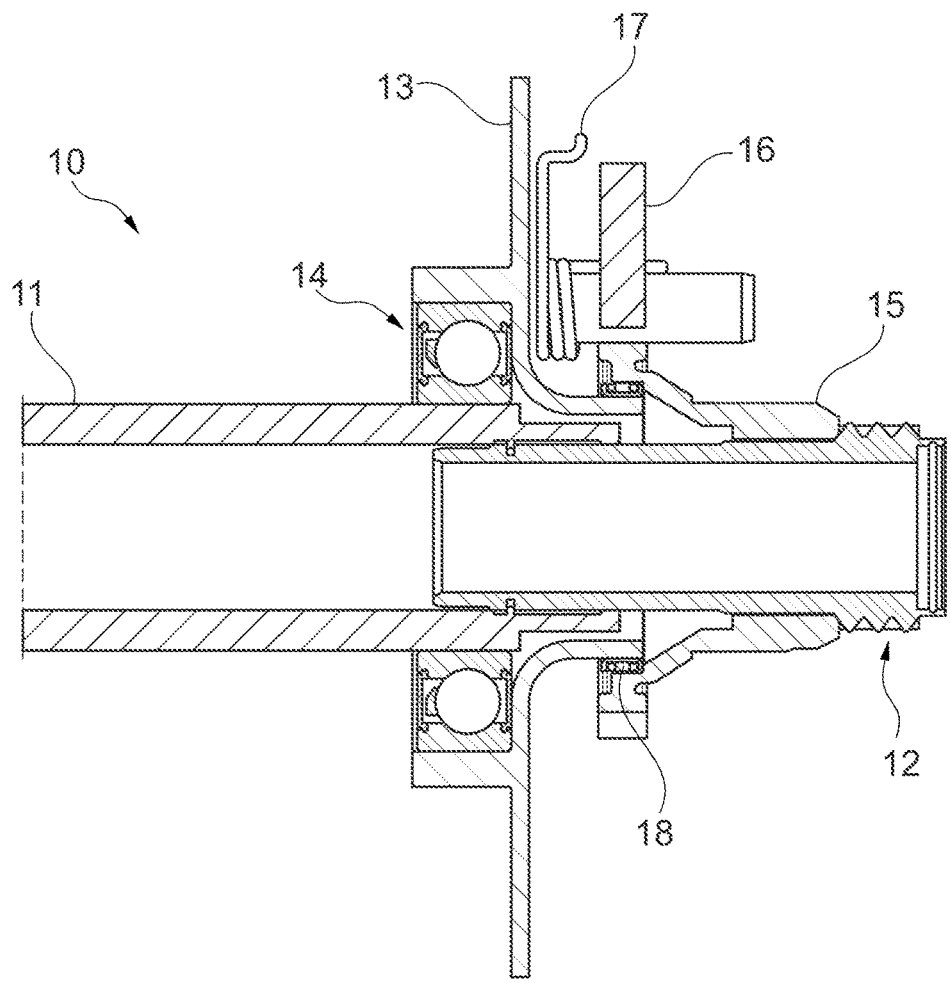
FIG. 1 shows a section of an example embodiment of a park lock gear assembly.

A park lock gear assembly 10 for a transmission unit of a vehicle is explained in more detail below with reference to FIGS. 1 through 4.

The park lock gear assembly 10 includes a park lock gear 15 which is arranged on a transmission shaft 12 of a transmission unit of a vehicle and a housing unit 13 of a motor unit. The housing unit 13 includes at least one portion which is provided parallel to the transmission shaft 12 and which is arranged to be adjacent to the park lock gear 15. As can be seen clearly in FIGS. 1 and 2, a bearing assembly 18 is provided below the park lock gear 15 between the park lock gear 15 and the at least one portion of the housing unit 13.

Figure 2:
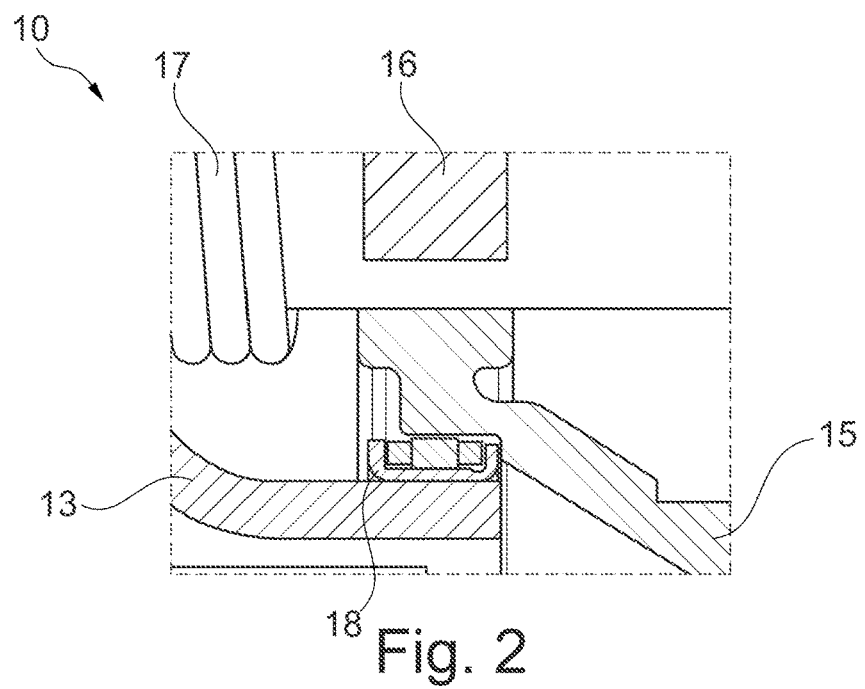
FIG. 2 shows an enlarged section of the park lock gear assembly shown in FIG. 1.

As can also be seen clearly in FIGS. 1 and 2, the portion of housing unit 13 that is arranged parallel to transmission shaft 12 or parallel to rotor shaft 11 provides a contact surface for the bearing assembly 18 so that it is arranged below the park lock gear 15.

The bearing assembly 18 is arranged with a radial clearance between the park lock gear 15 and the at least one portion of the housing unit 13. In the exemplary embodiment shown, the bearing assembly 18 is arranged in a non-rotatable manner on at least one housing portion of the housing unit 13 and a radial clearance with respect to the park lock gear 15 is provided. The radial clearance may be provided in such a way that the bearing assembly 18 is not in engagement with the park lock gear 15 during operation. Since radial clearance is provided between the park lock gear 15 and the bearing assembly 18, the losses can be reduced and the speed stability can be increased.

In the embodiment shown, the park lock gear 15 is provided as a separate component. Alternatively, however, there is also the possibility of forming the park lock gear 15 integrally with a pinion element of the transmission unit of the vehicle. Due to the integral design of the park lock gear 15 with at least one pinion element of the transmission unit, the number of parts can be reduced and corresponding pre-pieces can be provided which can be combined to form various park lock gear assemblies 10 depending on the application.

In the embodiment shown, the bearing assembly 18 is provided as a rolling bearing unit which is pressed onto the at least one support-shaped portion of the housing unit 13. The bearing assembly 18 may be a radial bearing assembly 18. The bearing assembly 18 is arranged to be axially adjacent to a rotor shaft bearing assembly 14 of the rotor shaft 11. The bearing assembly 18 is provided on an outside of the housing unit 13 and the rotor shaft bearing assembly 14 is provided on an inside of the housing unit 13. In the example embodiment, the bearing assembly 18 and the rotor shaft bearing assembly 14 are arranged at the same radial distance from the axis of rotation of the rotor shaft 11 and the transmission shaft 12, respectively.

Figure 3:
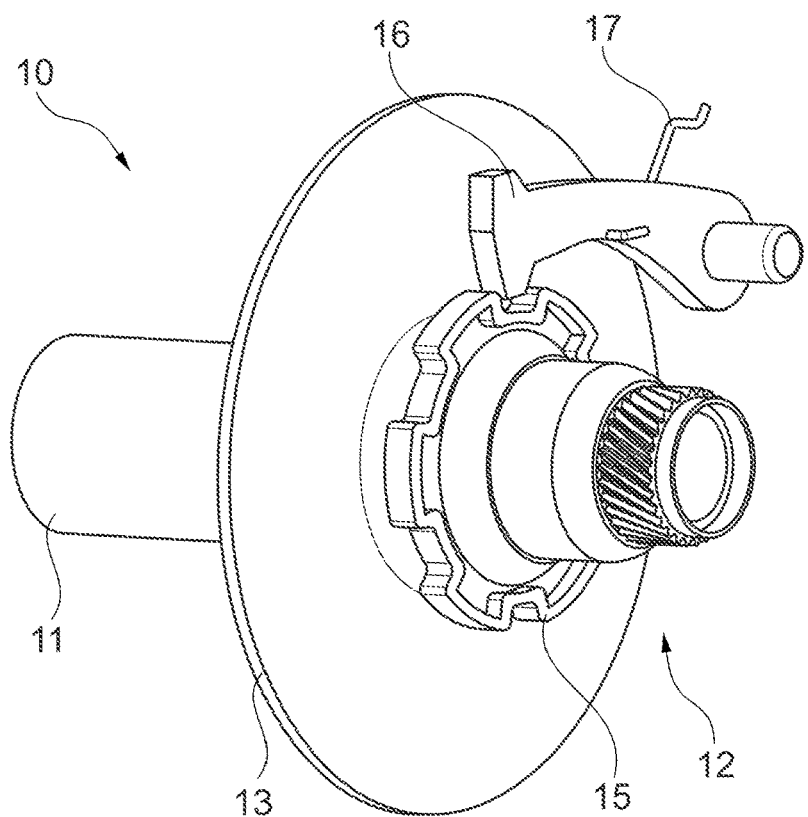
FIG. 3 shows a perspective view of the park lock gear assembly shown in FIG. 1.
Figure 4:
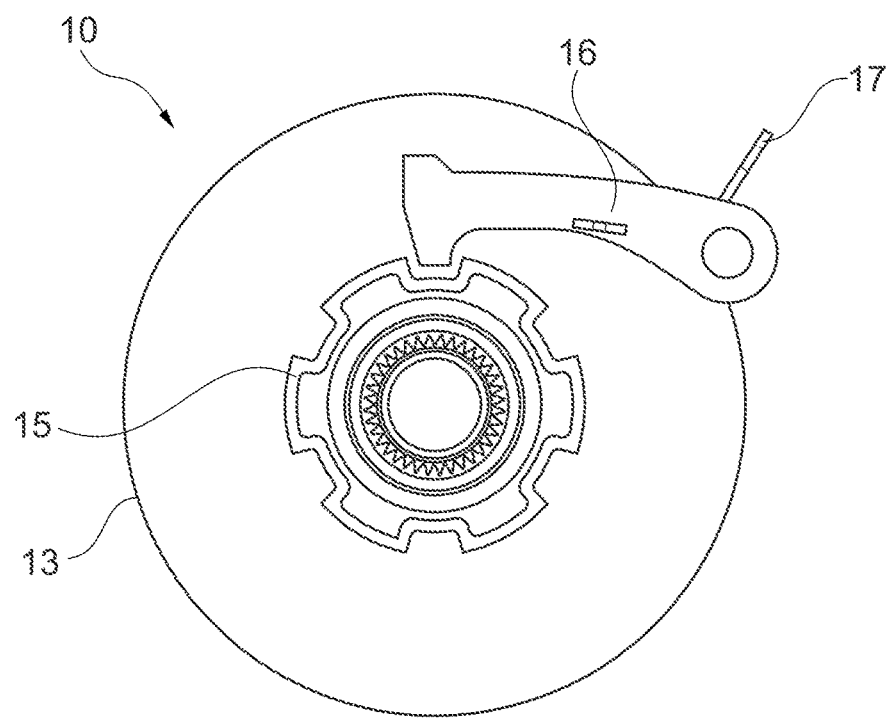
FIG. 4 shows another view of the park lock gear assembly of FIG. 1.

As can be seen particularly well in FIGS. 3 and 4, the park lock gear 15 includes a toothing into which a correspondingly designed portion of the locking pawl 16 can engage to lock the transmission shaft 12 or the transmission. The locking pawl 16 is acted upon accordingly by the spring element 17. To release the transmission shaft 12 or the transmission, the spring element 17 is acted upon accordingly and the locking pawl 16 is moved out of the toothing.

As a result, an impact load can be received by the bearing assembly 18 or additionally received by the bearing assembly 18 as a result of the present disclosure, so that an impact load that must be received by the rotor shaft bearing assembly 14 is at least reduced.

REFERENCE NUMERALS

10 Park lock gear assembly
11 Rotor shaft
12 Transmission shaft
13 Housing/motor housing
14 Rotor shaft bearing assembly
15 Park lock gear
16 Locking pawl
17 Spring element
18 Bearing assembly/Radial bearing

The invention claimed is:

1. A park lock gear assembly for a transmission unit of a vehicle, comprising:
   at least one park lock gear which is arranged on a transmission shaft of the transmission unit; and
   at least one housing unit of a motor unit, wherein the housing unit comprises at least one portion which is provided parallel to the transmission shaft and which is arranged to be adjacent to the park lock gear;
   wherein a bearing assembly is provided between the park lock gear and the at least one portion of the housing unit; and
   wherein the bearing assembly is not in engagement with the park lock gear during operation.

2. The park lock gear assembly according to claim 1, wherein the bearing assembly is arranged with a radial clearance between the park lock gear and the at least one portion of the housing unit.

3. The park lock gear assembly according to claim 1, wherein the bearing assembly is a rolling bearing unit pressed onto the at least one portion of the housing unit.

4. The park lock gear assembly according to claim 1, wherein the bearing assembly is arranged to be axially adjacent to a rotor shaft bearing assembly of a rotor shaft.

5. The park lock gear assembly according to claim 4, wherein the bearing assembly and the rotor shaft bearing assembly are arranged at a same radial distance from an axis of rotation of the rotor shaft.

6. A motor/transmission unit comprising at least one park lock gear assembly according to claim 1.

7. A park lock gear assembly for a transmission unit of a vehicle, comprising:
   a transmission shaft;
   a park lock gear arranged on the transmission shaft;
   a housing unit of a motor unit, the housing unit comprising a portion extending parallel to the transmission shaft and adjacent to the park lock gear; and
   a bearing assembly disposed between the park lock gear and the portion of the housing unit, wherein the bearing assembly is not engaged with the park lock gear during operation.

8. The park lock gear assembly of claim 7, wherein the bearing assembly is arranged with a radial clearance between the park lock gear and the portion of the housing unit.

9. The park lock gear assembly of claim 8, wherein the bearing assembly is arranged on the portion of the housing unit with the radial clearance between the bearing assembly and the park lock gear.

10. The park lock gear assembly of claim 7, wherein the bearing assembly is a rolling bearing unit pressed onto the portion of the housing unit.

11. The park lock gear assembly of claim 7 further comprising a rotor shaft with a rotor shaft bearing assembly, wherein the bearing assembly is axially adjacent to the rotor shaft bearing assembly.

12. The park lock gear assembly of claim 11, wherein the bearing assembly and the rotor shaft bearing assembly are arranged at a same radial distance from an axis of rotation of the rotor shaft.

13. A motor/transmission unit comprising the park lock gear assembly of claim 7.

14. A park lock gear assembly for a transmission unit of a vehicle, comprising:
- a transmission shaft;
- a park lock gear arranged on the transmission shaft;
- a housing unit of a motor unit, the housing unit comprising a portion extending parallel to the transmission shaft and adjacent to the park lock gear; and
- a bearing assembly disposed between the park lock gear and the portion of the housing unit, wherein:
    - the bearing assembly is arranged with a radial clearance between the park lock gear and the portion of the housing unit; and
    - the bearing assembly is arranged on the portion of the housing unit with the radial clearance between the bearing assembly and the park lock gear.

15. The park lock gear assembly of claim 14, wherein the bearing assembly is a rolling bearing unit pressed onto the portion of the housing unit.

16. The park lock gear assembly of claim 14 further comprising a rotor shaft with a rotor shaft bearing assembly, wherein the bearing assembly is axially adjacent to the rotor shaft bearing assembly.

17. The park lock gear assembly of claim 16, wherein the bearing assembly and the rotor shaft bearing assembly are arranged at a same radial distance from an axis of rotation of the rotor shaft.

* * * * *